S. VINCENT.
WOODWORKING MACHINE.
APPLICATION FILED SEPT. 27, 1919.
1,361,295.
Patented Dec. 7, 1920.
3 SHEETS—SHEET 3.
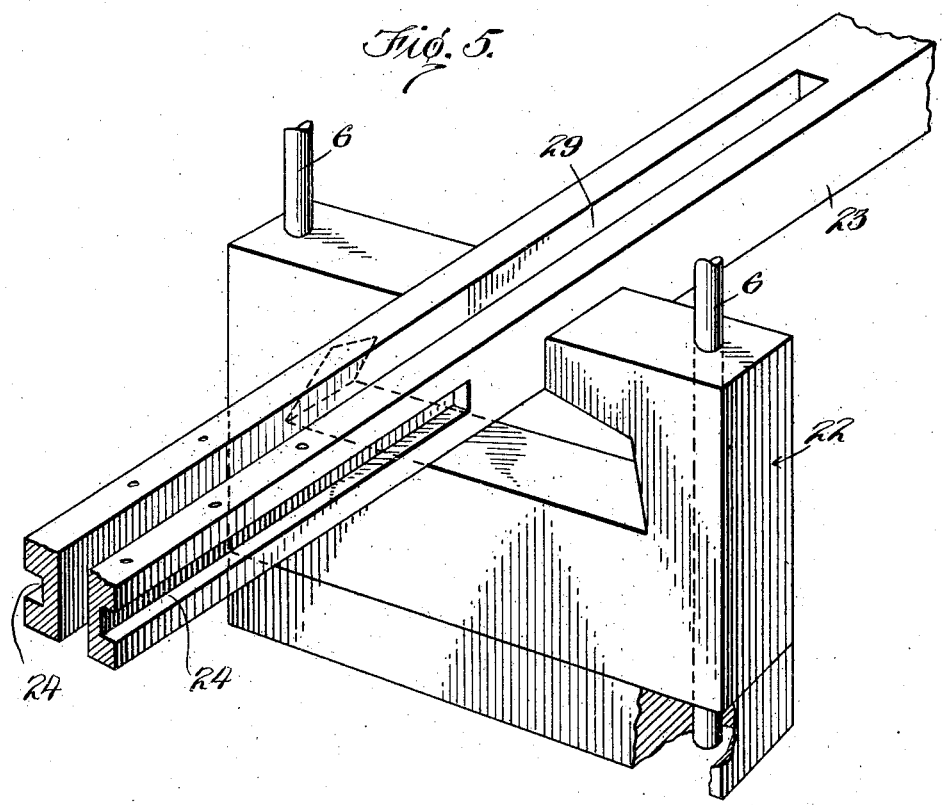
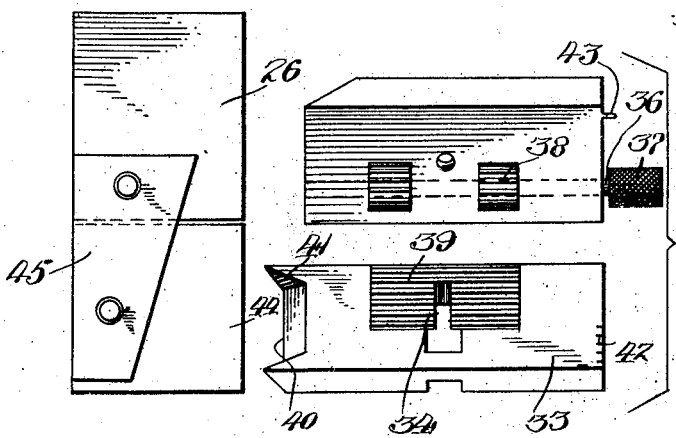
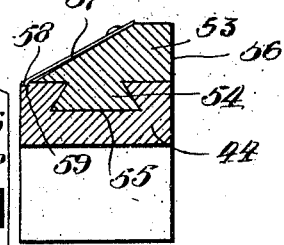
Inventor:
Simon Vincent

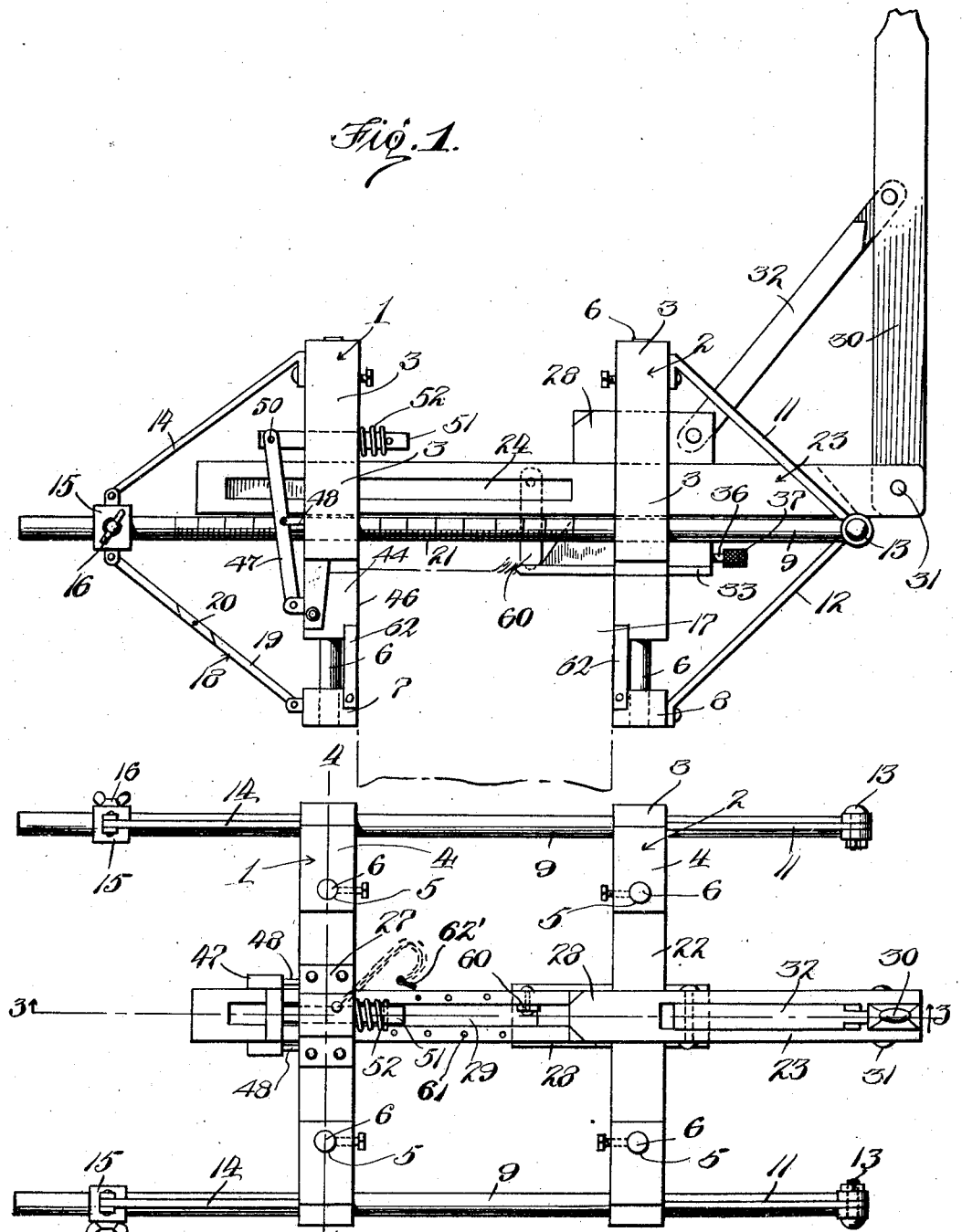

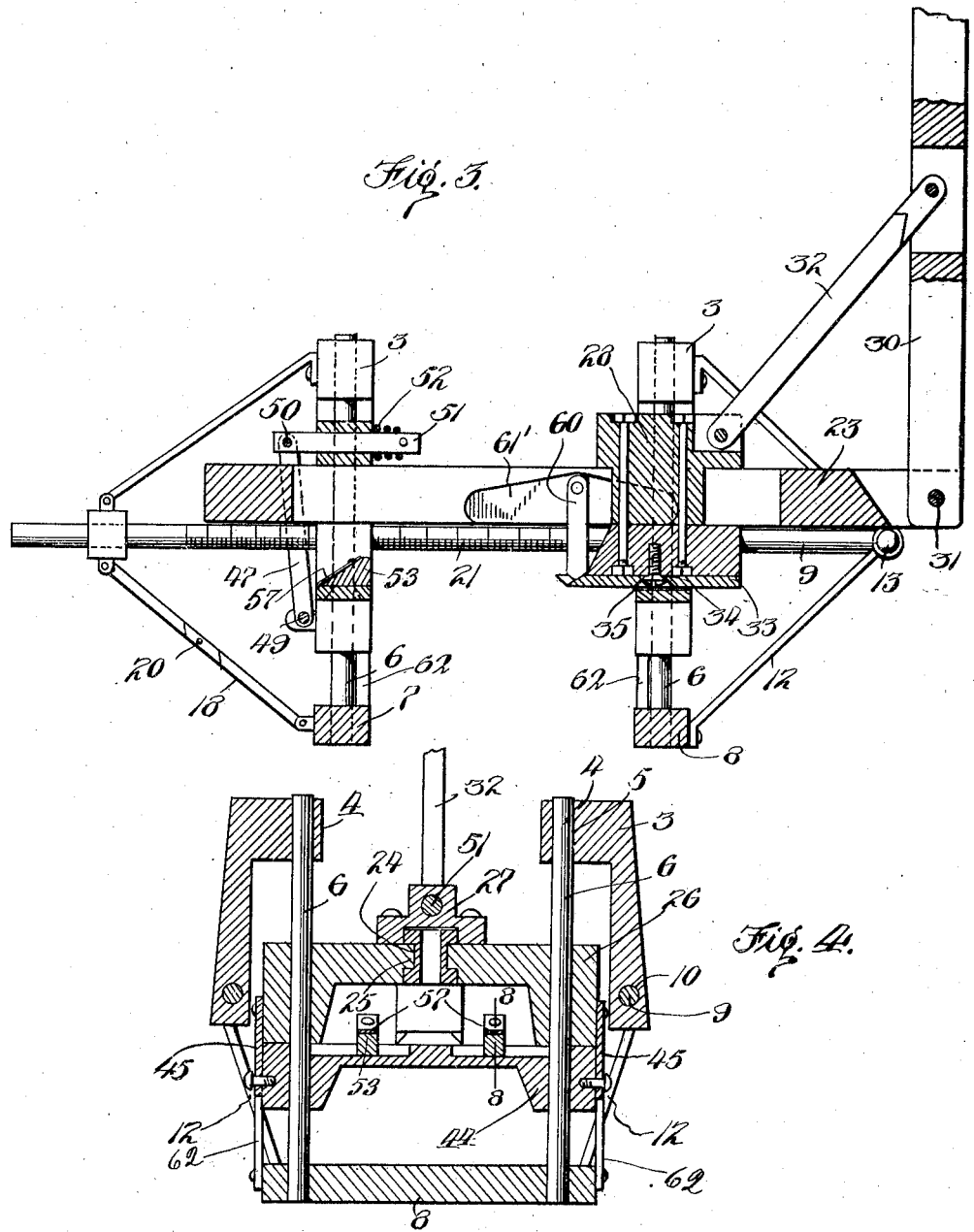

UNITED STATES PATENT OFFICE.

SIMON VINCENT, OF WASHINGTON, DISTRICT OF COLUMBIA.

WOODWORKING-MACHINE.

1,361,295.  Specification of Letters Patent.  Patented Dec. 7, 1920.

Application filed September 27, 1919. Serial No. 326,849.

*To all whom it may concern:*

Be it known that I, SIMON VINCENT, a citizen of the United States, residing at 463 Delaware avenue southwest, in the city of Washington and District of Columbia, have invented certain new and useful Improvements in Woodworking-Machines, of which the following is a specification.

This invention relates to wood working machines and more particularly to a machine for cutting mortises.

One of the objects of the present invention is to provide a machine of the class described which may be readily and conveniently operated by hand and which may be carried from place to place and employed either in cutting work upon the bench or cutting work which is already placed in position. In other words, the invention has for one of its objects to provide a machine of this class which may be employed in cutting work before the work is placed in position, or it may be applied in operative position to a piece of work already in position, as, for example, a door or window jamb for the purpose of cutting hinge mortises.

Another object of the invention is to provide means whereby the machine may be applied to pieces of work of varying thicknesses and readily adjusted to working position and clamped in place.

The invention has as another object to so construct the machine that the length of the stroke of the cutting element may be regulated so as to govern the length of the cut, thus adapting the machine to cut, for example, hinge mortises of various widths in accordance with the width of the hinge leaves which the mortises are to receive.

A further object of the invention is to provide means for automatically regulating the depth of cut of the cutting element of the machine during each stroke thereof, so that a certain definite thickness of the material will be removed at each stroke and there will be no likelihood of the cutting element gouging into the work in a harmful manner.

In cutting hinge mortises by the use of the machine, the means provided for limiting the stroke of the cutting element will of course operate to preclude any likelihood of chipping or splintering the wood, but, where the mortise to be cut is to extend the entire width of the piece of work, or in other words from one face thereof to the opposite face, it is desirable that some means be provided to prevent such chipping or splintering of the work at the last mentioned face thereof, and therefore the present invention has as a further important object to provide means for accomplishing this result. In this connection, the invention contemplates the provision of means which will so co-act with the said face of the work and with the cutting edge of the cutting element of the machine as to insure a clean and neat cleavage of the material, leaving no ragged or unsightly edges requiring further dressing to complete the job.

A still further object of the invention is to provide means whereby, through the use of a cutting blade having a relatively narrow cutting edge, a relatively long mortise may be cut, or, if desired, by the same adjustment which is employed in adapting this blade to cut a wide or long mortise, a stepped cut in the work may be made. With this end in view, the machine embodies means whereby the blade may be adjusted laterally with relation to the direction of its stroke, and the invention has as a further object the provision of means whereby this adjustment may be conveniently effected without requiring the machine to be removed from the work for the making of such adjustment.

Various other objects and advantages of the structure will be made evident as the description proceeds.

In the accompanying drawings, illustrating the invention,

Figure 1 is a side elevation of the machine applied to a piece of work in operative position, Fig. 2 is a top plan view of the machine, Fig. 3 is a vertical longitudinal sectional view through the machine on the line 3—3 of Fig. 2, Fig. 4 is a vertical transverse sectional view on the line 4—4 of Fig. 2, Fig. 5 is a sectional perspective view of a portion of the machine, Fig. 6 is a group perspective view of the cutting blade of the machine and the blade stock, Fig. 7 is a side elevation of a portion of the machine, illustrating the means provided for guiding the presser head of the machine, Fig. 8 is a vertical sectional view on the line 8—8 of Fig. 4.

In the drawings, the machine is illustrated as comprising front and rear heads which are indicated in general respectively by the numerals 1 and 2. Each of these heads comprises side members 3 provided with laterally inwardly projecting portions 4 having openings 5 in which are secured the upper ends of upright rods or standards 6 which carry, at their lower ends the clamping members of the machine, as will be presently explained. The clamping member which is associated with the forward head is indicated by the numeral 7, and the corresponding member which is associated with the rear head is indicated by the numeral 8. Side rods 9 are fitted and secured through the lower portions of the members 3 of the rear head 2 and slidably fit through openings 10 formed in the lower portions of the side members of the forward head as clearly shown in Fig. 4 of the drawings. Bracket arms 11 and 12 are connected by bolts or other means, as at 13, to the rear ends of the side rods 9 and respectively to the members 3 of the said rear head and the rear clamping member 8. In this manner the members 3 of the rear head, the standards 6 associated therewith, and the clamping member 8 are rigidly connected together and firmly braced with relation to one another. In a similar manner, bracket arms 14 are secured at their upper ends to the members 3 of the front head 1 and at their lower ends to collars 15 adjustably fitted upon the side rods 9 and held in place by means of set screws 16. It will be understood that by loosening these set screws, the front and rear heads may be adjusted with relation to each other so as to adapt them to the opposite faces of the piece of work to be acted upon as clearly shown in Fig. 1 in which the said piece of work is indicated by the numeral 17. Jointed bracket arms 18, comprising sections 19 pivotally connected as at 20 in the manner of a toggle joint extend between the collars 15 and the forward clamping member 7. At this point it may be stated that in applying the machine to a piece of work, the set screws 16 are loosened and the forward head 1 is adjusted along the side rods 9 until the clamping members 7 and 8 engage against the opposite faces of the work, the joint in the arms 18 being at this time broken. The set screws are then tightened, and finally the arms 18 are straightened thereby causing them to act in the manner of toggles to exert pressure against the clamping member 7 and cause the same to bear firmly against the respective face of the work. In this manner, the machine may be more securely clamped to the work than would be possible by the use of the set screws alone. Also, this arrangement permits of a ready and quick release of the machine from the work as this may be accomplished merely by breaking the joints of the arms 18 and without the necessity of loosening the set screws 16. If desired, either or both of the rods 9 may be provided with scale 21 so that the heads of the machine may be readily set or adjusted for given widths of material to be cut.

The numeral 22 indicates a block which is vertically slidably mounted upon the upright rods or standards 6 of the rear head of the machine, and rigidly secured to and supported by this block is the rear portion of a guide bar 23 which extends a suitable distance both forwardly and rearwardly of the block. In its opposite side faces, this guide bar is formed with grooves 24 which receive tongues 25 formed upon the opposing ends of blocks 26 which are slidably mounted upon the forward standards 6. The said ends of the blocks 26 are connected by means of a bridge piece 27 which serves an additional function to be presently explained. By this construction, the guide bar 23 is firmly supported and yet the forward head of the machine may be adjusted toward and from the rear head in the manner before explained.

The cutter head of the machine is indicated in general by the numeral 28 and the same is slidably mounted in a slot 29 formed longitudinally in the guide bar 23, so that it may be reciprocated. To provide for such movement of the cutter head, there is provided a hand lever 30 which is pivotally mounted at its lower end as at 31 upon the rear end of the guide bar 23 and which is connected by means of a link 32 with the said cutter head as clearly shown in Fig. 3 of the drawings.

The blade which is mounted upon the cutter head is indicated in general by the numeral 33 and the same is formed with a transverse slot 34 through which is passed a screw 35 which enters the under side of the cutter head. In this manner the blade 33 is supported upon the under side of the cutter head for lateral adjustment, and this adjustment is effected by means which will now be described. A shaft 36 is rotatably mounted within the cutter head and is provided at its rear end with a knurled head 37 by means of which it may be rotated. Pinions 38 are fixed upon this shaft and are preferably located one in advance of and the other to the rear of the slot 34 and screw 35. These pinions mesh with a rack 39 formed upon the upper face of the blade 33 and it will be understood that when the shaft is rotated, the pinions will coact with the rack to laterally adjust the said blade. Inasmuch as the pinions are located as stated above, the alinement of the blade will be maintained although the single screw 35 is provided to guide the same in its transverse movement. The blade is provided at its forward end with a transverse cutting edge 40 at the ends of which are located vertically disposed cutting edges 41 to make the side cuts through the material, and thus adapt the blade to cut a mortise of the usual form. In order that the amount of adjustment of the blade may be readily determined, it is provided at its rear edge with a scale 42 with the marks of which a pointer 43 upon the rear end of the cutter head is designed to register. At this point it will be evident that upon each forward stroke of the lever 30, the blade will be caused to make a shaving cut through the work and that while the blade may be relatively narrow, a wide cut may be made by lateral adjustment of the blade, or, after the blade has cut through the work to a predetermined depth, it may be laterally adjusted to another position and a cut made of another depth. In this manner, ornamental cuts may be made.

As previously stated, means is provided for preventing splintering of the work at the ends of the strokes of the blade, and this means consists in part of a presser head indicated in general by the numeral 44. This head is formed near its ends with slots or relatively large openings through which pass the forward standards 6, and the head is supported for slight oscillatory movement by means of links 45 connected with the ends of the presser head and with the outer ends of the blocks 26. The presser head 44 has a plane rear face 46 which is to be brought to bear firmly and flatly against the adjacent face of the work in a manner which will now be explained. Rocker arms 47 are pivotally mounted as at 48 upon the adjacent ends of the blocks 26 and are pivotally connected at their lower ends as at 49 with the forward side of the presser head. At their upper ends, these arms are pivotally connected as at 50 with the forward end of a plunger 51 slidably mounted in the bridge piece 27 and normally yieldably held in a rearward direction by means of a spring 52. The forward movement of the plunger will of course so rock the arms 47 as to bring the presser head into firm engagement against the forward face of the piece of work, and this movement of the plunger is effected by the engagement thereagainst of the cutter head 28 as the same reaches the limit of its forward stroke. The presser head is so positioned that the upper face thereof will occupy a plane with the bottom of the cut being made by the blade in the operation of the machine, and therefore, when the said presser head is brought to bear against the face of the work, it will clamp the same in a manner to prevent splintering and to insure of a clean shaving being removed. In order to prevent splintering of the work at the opposite sides of the cut, presser lugs 53 are provided and these lugs are formed with dove-tail lower ends 54 which are slidably fitted in similarly formed grooves 55 in the upper side of the presser head 44 as clearly shown in Fig. 8 of the drawings. These lugs are provided with plane faces 56 which occupy the same vertical plane as the face 46 of the presser head and which are designed to bear firmly and flatly against the face of the work at the opposite sides of the cut being made therein. It is desirable that these lugs be adjusted so as to be positioned immediately outwardly of the path of movement of the end cutting edges of the blade, and in order that they may be held in their positions of adjustment, resilient latch members 57 are secured upon the upper inclined sides of the lugs and are provided at their lower ends with teeth 58 for engagement interchangeably in notches 59 formed in the forward upper edge of the presser head 44. It will be understood that these lugs are to be adjusted manually so that they will lie at opposite sides of the path of movement of the cutting edges of the blade and so that they together with the upper edge of the face of the presser head will define or outline the end of the shaving to be removed and thus prevent the removal of any surplus material from the piece of work.

It will be understood that in the operation of the machine, the guide and its supporting means will feed downwardly upon the standards as successive cuts are made, and in order to limit the depth of each cut, a dog 60 is pivoted at its upper end to the guide bar 23 in a recess 61' formed in the face thereof and is designed to engage at its lower end against the upper face of the piece of work.

In order that the cutter head 28 may have its forward movement limited to regulate the length of cut made in the material, the stock 23 is formed with spaced series of openings 61 into which may be interchangeably fitted one or more pins 62' which will then be located in the path of movement of the said cutter head.

By reference to Fig. 3 of the drawings, it will be observed that the recess 61' extends both forwardly and rearwardly of the pivot for the dog 60 so that the cutter head may sweep past the dog without binding as the said head is reciprocated, the dog being free to swing in either direction to permit of passage past it of the said head.

In order that the members 7 and 8 may be adapted to clamp a piece of work which is relatively thin and which would not be suitably engaged by the opposing faces of the said members, each of the members is provided at each of its ends with an extension 62, the said extensions projecting upwardly from the ends of the respective members with their edges which are to engage the opposite sides of the work located in the same plane as the work-engaging faces of the said respective members 7 and 8.

Having thus described the invention, what I claim as new is:

1. In a machine of the class described, attaching and supporting means, a guide carried thereby and so supported as to feed by gravity with relation to the work, a cutter supported for reciprocation upon the guide and having feeding movement therewith, and means carried by the guide and engageable with the work to regulate the downward feed of the guide and thereby regulate the depth of cut of the cutter.

2. In a machine of the class described, spaced work engaging heads, a cutter mounted for reciprocation between the heads, means for reciprocating the cutter, and a presser member upon one of the heads for engagement against a face of the work in the path of movement of the cutter for outlining the cut.

3. In a machine of the class described, spaced work engaging heads, a cutter mounted for reciprocation between the heads, means for reciprocating the cutter, a presser member carried by one of the heads and including elements to engage the face of the work in the path of the cutter, and means whereby the said elements may be relatively adjusted.

4. In a machine of the class described, spaced work engaging heads, a cutter mounted for reciprocation between the heads, means for reciprocating the cutter, a presser member upon one of the heads for engagement against a face of the work in the path of movement of the cutter, and means for automatically actuating the said presser member upon reciprocation of the cutter.

5. In a machine of the class described, spaced work engaging heads, a cutter mounted for reciprocation between the heads, means for reciprocating the cutter, a presser member upon one of the heads for engagement against a face of the work in the path of movement of the cutter, a plunger in the path of movement of the cutter, and operative connection between the plunger and the said presser member for automatically actuating the latter in the movement of the cutter and its engagement with the plunger.

In testimony whereof I affix my signature.

SIMON VINCENT.